United States Patent
Okada

(10) Patent No.: US 6,219,511 B1
(45) Date of Patent: Apr. 17, 2001

(54) IMAGE READING APPARATUS HAVING A GUIDE MEMBER AND TRANSPORT MEMBER

(75) Inventor: Osamu Okada, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/998,535

(22) Filed: Dec. 26, 1997

(30) Foreign Application Priority Data

Dec. 27, 1996 (JP) .................................................... 8-350087

(51) Int. Cl.$^7$ ............................ G03G 15/30; H04N 1/04
(52) U.S. Cl. ............................ 399/203; 358/496; 399/215
(58) Field of Search .................................... 399/203, 206, 399/215, 379; 358/496

(56) References Cited

U.S. PATENT DOCUMENTS

| | | | |
|---|---|---|---|
| 4,429,866 | * 2/1984 | Castro-Hahn | 399/379 X |
| 4,474,457 | * 10/1984 | Phelps | 399/379 |
| 4,970,606 | * 11/1990 | Shima | 358/496 X |
| 5,168,310 | * 12/1992 | Hayashi et al. | 399/206 X |
| 5,206,735 | 4/1993 | Gauronski et al. | 358/296 |
| 5,339,139 | * 8/1994 | Fullerton et al. | 399/203 |

* cited by examiner

Primary Examiner—Fred L. Braun
(74) Attorney, Agent, or Firm—Sidley & Austin

(57) ABSTRACT

An image reading apparatus has a reader to read document images and has a stationary image reading position. A transporter transports a document at constant speed onto the image reading position. The transporter includes a guide member and a transport member. The guide member guides document transport and is provided adjacent to the upstream side of the document reading position in the direction of document transport by the transporter. The transport member transports a document with gripping between the guide member and itself. The transport member is provided above the guide member.

28 Claims, 4 Drawing Sheets

IMAGE READING APPARATUS HAVING A GUIDE MEMBER AND TRANSPORT MEMBER

BACKGROUND OF THE INVENTION

1. Field of the Invention

The present invention relates to an image reading apparatus to read document images and used in copy machine and the like.

2. Description of the Related Art

Conventional image reading apparatuses (hereinafter referred to as "stationary platen panning devices") are known which read the image of an entire document by placing a document on a glass platen at the image reading position of a static reader, and transporting said document over said glass platen at a constant speed. In stationary platen panning devices, a document must be transported onto the glass platen with precision in order to accurately read the document image. To this end, stationary platen panning devices are known to provide a transport roller to transport a document between said transport roller and the glass platen.

In such stationary platen panning devices, although a document can be transported with precision in the range of the nip formed between the glass platen and the transport roller when said document is gripped between the transport roller and the glass platen, a disadvantage arises insofar as the document curls along the transport roller on the upstream side and downstream side of said nip.

On the other hand, stationary platen panning devices typically have a reader with a reading range capable of reading the width of the document in the document transport direction in a single pass. When the stationary platen panning device is an analog copy machine, the single pass reading range of the reader is particularly broad. Accordingly, the nip width between the transport roller and glass platen must be broader than the single pass reading range of the reader. Since the diameter of the transport roller in contact with the glass platen must be increased, therefore, the size of the image reading apparatus is increased.

OBJECTS AND SUMMARY

An object of the present invention is to provide an image reading apparatus capable of accurately transporting documents without increasing the overall size of the apparatus.

Objects of the present invention are attained by providing an image reading apparatus comprising:

a reader to read document images, said reader having a stationary image reading position; and a transporter to transport a document at constant speed onto the image reading position, said transporter including guide members and a transport member, said guide members to guide document transport and which are provided adjacent to the upstream side of a document reading position in the direction of document transport by said transporter, and said transport member to transport a document without gripping between said guide members and itself and provided above said guide members.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The image reading apparatus of the present invention is described hereinafter in terms of an embodiment as an analog copy machine with reference to the accompanying drawings.

Figure 1:
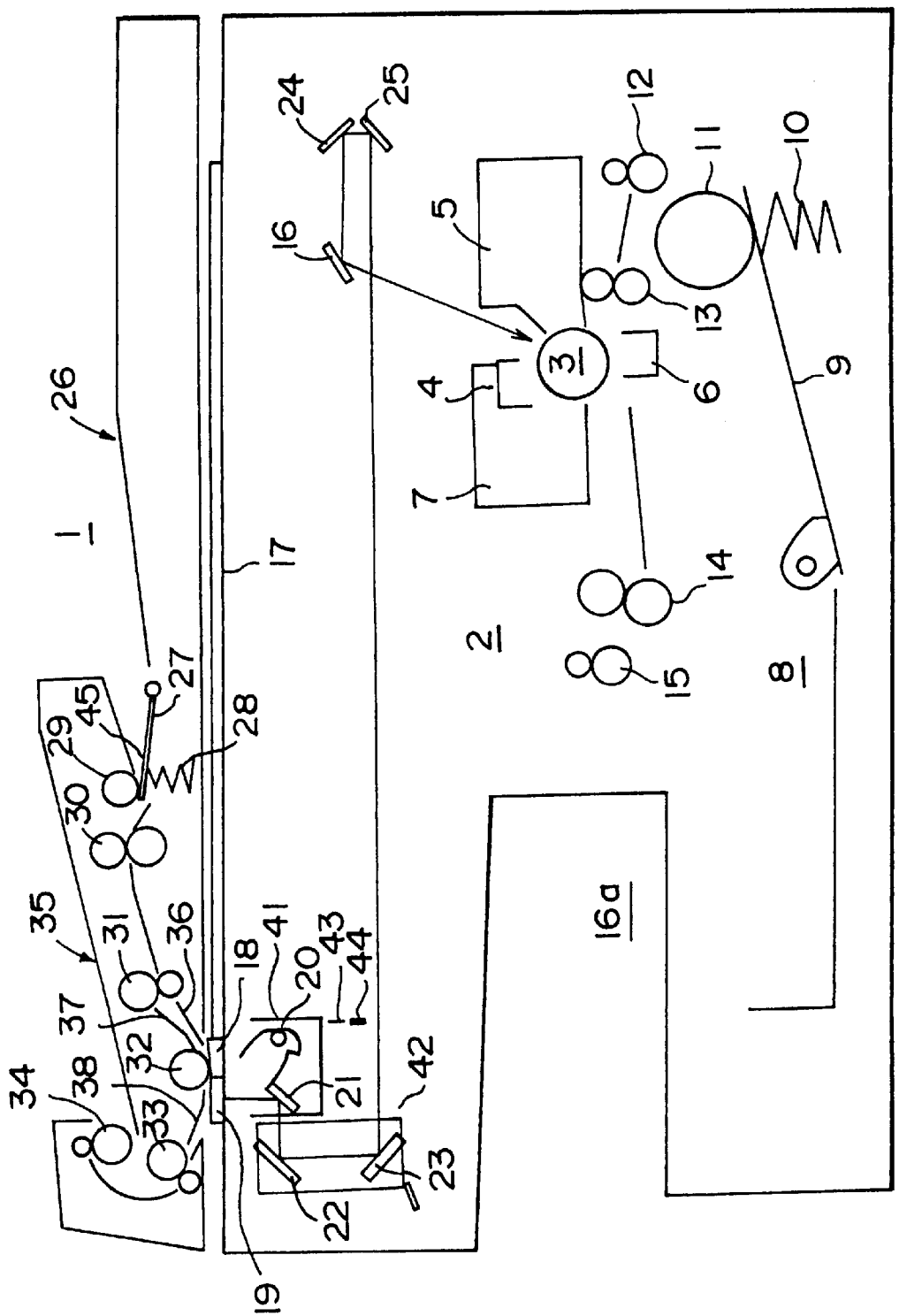
FIG. 1 is a section view of a copy machine related to an embodiment of the present invention.
Figure 2:
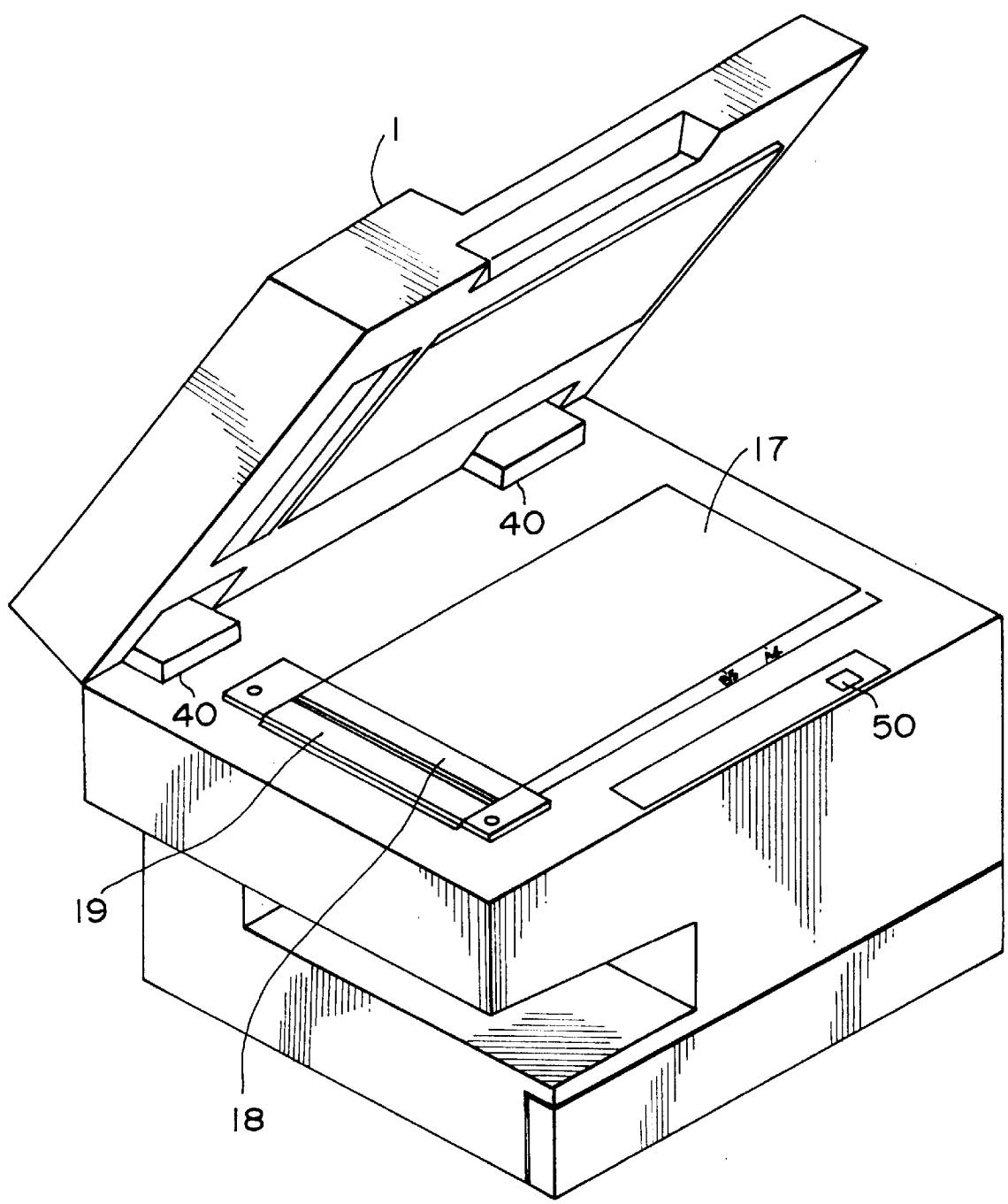
FIG. 2 is a perspective view of a copy machine related to an embodiment of the present invention.

The analog copy machine shown in FIGS. 1 and 2 comprises a copier unit 2 and a document feeding device 1 situated on top of copier unit 2.

Copier unit 2 copies a document image to a copy sheet via a well known electrophotographic process. The copier unit 2 comprises a photosensitive drum 3 supported so as to be rotatable, and sequentially arranged around the periphery of said drum 3 are charger 4, developing device 5, transfer charger 6, and cleaner 7. When an optical image of a document is exposed on the surface of photosensitive drum 3 which has been previously charged to a uniform charge by charger 4, an electrostatic latent image of said document is formed on the surface of photosensitive drum 3. This electrostatic latent image is developed by developing device 5 so as to produce a toner image. This toner image formed on the surface of the photosensitive drum 3 is transferred via transfer charger 6 onto a copy sheet transported from paper supply tray 8. Residual toner remaining on the surface of the photosensitive drum 3 is removed by cleaner 7.

A sheet lifting plate 9 which exerts an upward force via a spring 10 and is vertically moveable in one direction and an opposite direction is provided at the leading edge of paper supply tray 8, such that a copy sheet placed on said sheet lifting plate 9 is directed toward a feed roller 11 located thereabove. Copy sheets fed one sheet at a time by feed roller 11 are transported to the position of charger 6 via a pair of timing rollers 13. A copy sheet bearing the toner image transferred by transfer charger 6 is directed to a pair of fixing rollers 14 which fuse said toner image on said copy sheet, and thereafter the copy sheet is ejected to discharge unit 16a by a pair of discharge rollers 15.

The present embodiment is provided with a mirror scanning mode to copy a document placed on the glass platen by an operator, and a panning mode to copy a document transported at constant speed by automatic document feeder 1. The mirror scanning mode and panning mode are automatically selectable depending on whether or not a document is present in document tray 26 when the print key 50 is pressed by an operator.

On the top of copier unit 2 are sequentially arranged mirror scanning glass platen 17, document scale 18, and panning glass platen 19. Located below glass platens 17, 19 and document scale 18 are a first slider 41 upon which are mounted exposure lamp 20 and mirror 21, and a second slider 42 upon which are mounted mirrors 22 and 23, said first and second sliders 41 and 42 being moveable in lateral directions in the drawings. A notch 43 is formed on the bottom surface of first slider 41, and a sensor 44 is mounted on the copier unit 2 to detect said notch 43. When notch 43 is detected by the aforesaid sensor 44, the position of the first slider 41 is the first slider home position, which is the stationary position for the panning mode.

In the mirror scanning mode, the first slider 41 moves reciprocatingly below the mirror scanning platen 17, and the second slider 42 moves reciprocatingly at one half the speed of said first slider 41. At this time, the light reflected from a document illuminated by exposure lamp 20 is sequentially reflected by mirrors 21–25 and 16, and subsequently irradiates the surface of photosensitive drum 3. In the panning mode, however, the exposure lamp 20 and mirrors 21–23 all remain in a stationary state. At this time, exposure lamp 20 illuminates the panning platen 19, and the optical image light of part of the document transported at constant speed over the panning platen irradiates the surface of photosensitive drum 3 via mirrors 21–25 and 16. That is, the panning glass platen 19 corresponds to the image reading position of the present invention, and the exposure lamp 20 and mirrors 21–25 and 16 are correspond to the image reader.

Document feeding device 1 is described below. Document feeding device 1 corresponds to first transporter to transport a document at constant speed over the panning glass platen 19. Document feeding device 1 is joined to the copier unit 2 on the interior side by hinges 40, and opens upward relative to the body of the copier unit 2. Document feeding device 1 briefly is a device to feed documents over panning platen 19; a document tray 26 is formed on the top surface of document feeding device 1 at a position above mirror scanning platen 17, and accommodates stacked documents to be read by the reader. A document lifting plate 27 is provided at the edge of the document tray 26 in the document transport direction, and exerts an upward force via a spring 28 and is vertically moveable in one direction and an opposite direction. Document lifting plate 27 is lifted upward by spring 28 only when a document is transported, and at other times is pulled downward by a retracting means not shown in the illustration. Above document lifting plate 27 is provided a document sensor 45 to detect the presence/absence of a document. When an operator presses the print key 50 and document sensor 45 detects a document, the panning mode is set and the retracting means is released such that the document lifting plate 27 is raised. On the other hand, when print key 50 is pressed and document sensor 45 does not detect a document, the mirror scanning mode is set.

A sheet placed on document lifting plate 27 is directed upward to top pick-up roller 29. A document fed one sheet at a time by pick-up roller 29 passes between top guide 37 and bottom guide 36 via the transporting force supplied by the pair of transport rollers 30 and pair of timing rollers 31, and arrives at transport roller 32 which is the transport member directly upstream from the panning platen. A document that passes transport roller 32 then passes between panning glass platen 19 and top guide 38 located thereabove, passes between a pair of transport rollers 33, and is ejected via a pair of discharge rollers 34 onto discharge tray 35 formed on the top surface of document feeding device 1 at a position above said transport mechanism. That is, transport roller 32 corresponds to the second transporter of the present invention, and document scale 18 corresponds to a guide member.

Figure 3:
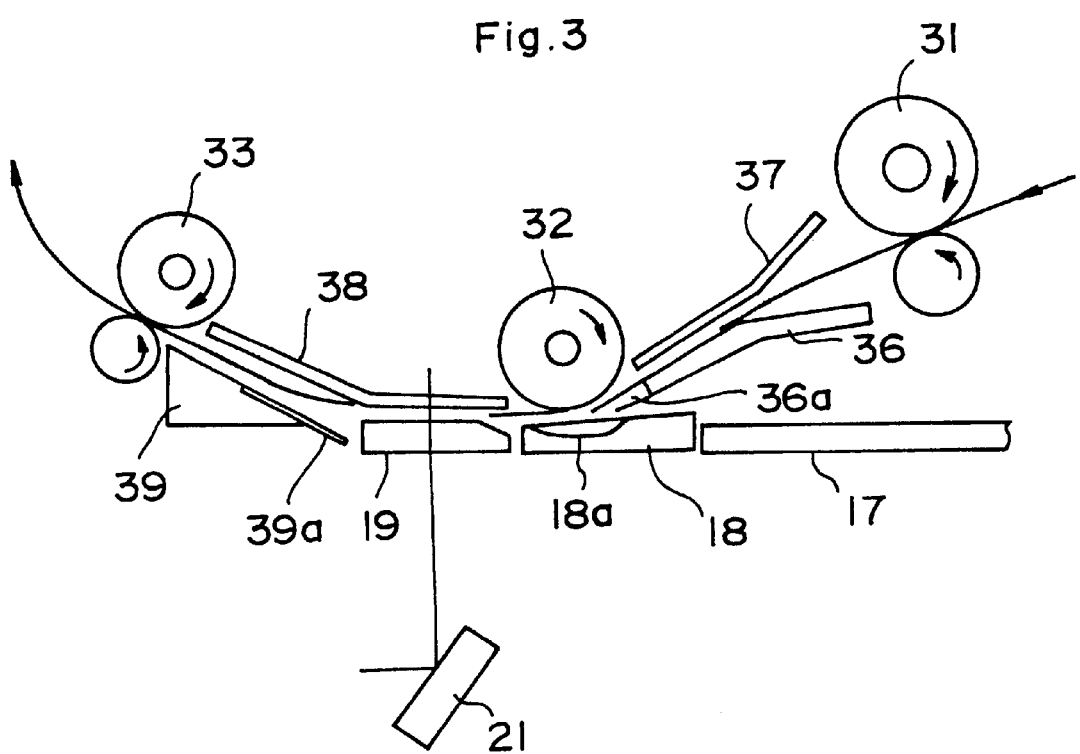
FIG. 3 is a section view showing the essential part of the image reading apparatus related to an embodiment of the present invention.
Figure 4:
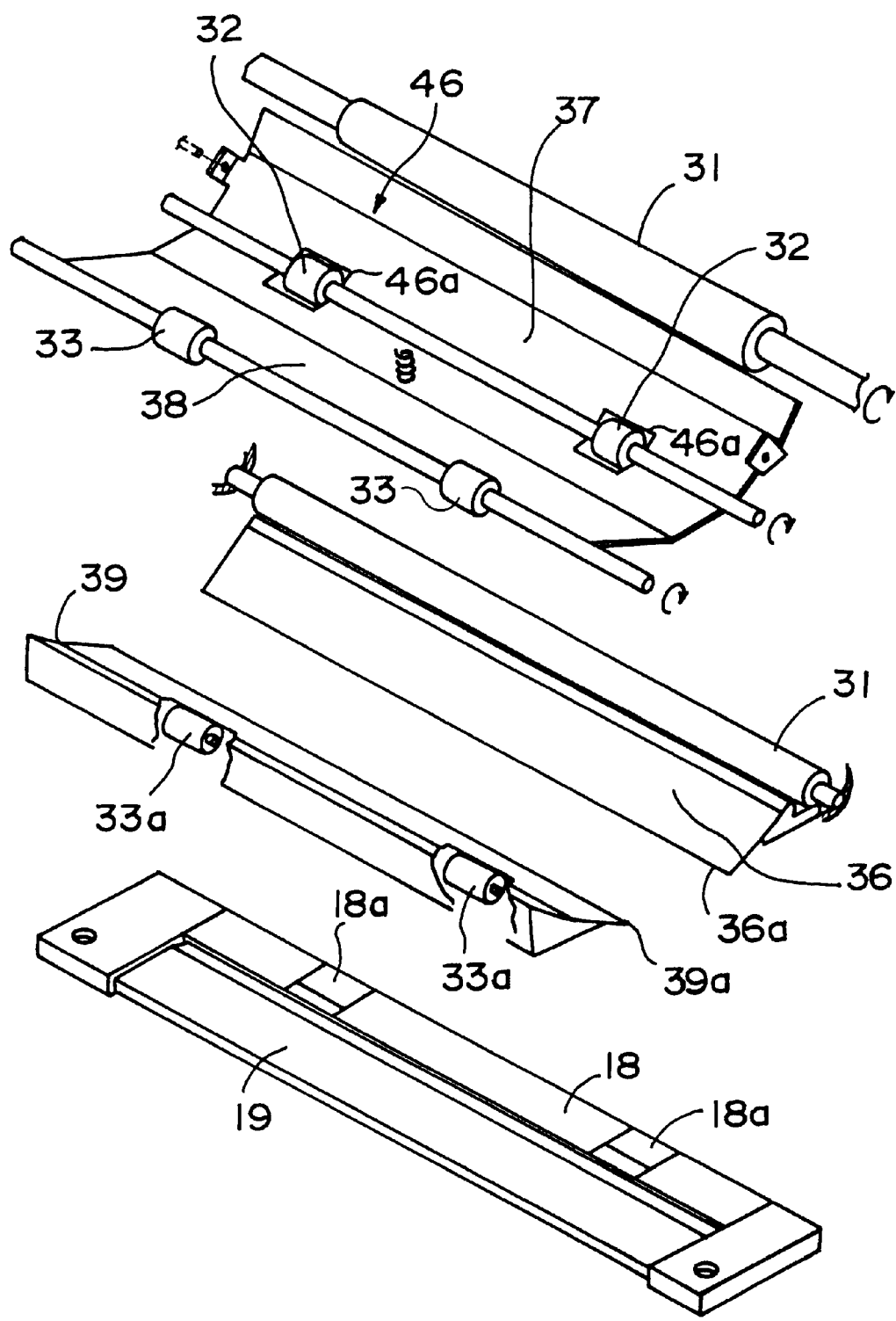
FIG. 4 is an exploded perspective view showing the essential part of the image reading apparatus of an embodiment of the present invention.

FIGS. 3 and 4 show details of the essential part of document feeding device 1 of the embodiment.

The previously mentioned top guides 37 and 38 are formed by a single guide panel 46. The rotational axis of transport roller 32 is provided above guide panel 46, but openings 46a are provided in guide panel 46 at a position corresponding to transport roller 32, such that said transport roller 32 protrudes downward from said openings 46a.

Transport roller 32 is positioned adjacent to the top surface of document scale 18 which is mounted on the side of copier unit 2. Specifically, the bottom surface of transport roller 32 is disposed at a position of equal height to the top surface of document scale 18. On the other hand, document scale 18 is provided with channels 18a at a position confronting the transport roller 32 and having a width sufficient to allow transport roller 32 to be accommodated therein so as to avoid direct contact with the transport roller 32. Since transport roller 32 does not grip the document passing between said roller and the glass platen, the diameter of the roller need not be increased, thereby avoiding an increase in the size of the document feeding device 1.

Flexible films 36a and 39a are respectively adhered to the top surface of bottom guide 36 directly upstream from document scale 18 and bottom guide 39 directly downstream from panning platen 19. The flexible film 36a on the upstream side of document scale 18 functions to make contact with the document on the transport roller 32 side. The flexible film 39a directly downstream from the panning platen functions to make contact with the document on the top guide 38 side.

In this construction, a document transported by the pair of timing rollers 31 is moved downward at an angle toward transport roller 32, and is fed by transport roller 32 between said transport roller 32 and document scale 18 parallel to panning platen 19. A document that passes panning platen 19 is guided by top guide 38 and flexible film 39a at an upward angle. Since the document transport path has a convex curved shape under the position of transport roller 32, the document makes contact with said transport roller 32 via the stiffness of the document sheet itself. Accordingly, transport roller 32 exerts a transporting force on the document without a mechanism to grip said document. Of course, transport roller 32 also may be constructed so as to make contact with the document scale 18. A construction wherein the transport roller 32 does not make contact with the document scale 18 is advantageous, however, insofar as the document scale 18 is not subject to damage by contact with the transport roller.

Furthermore, since transport roller 32 is adjacent to the panning platen 19 at the image reading position, the portion of a document that has passed transport roller 32 arrives at the reading position without disruption. In particular, because the bottom surface of the transport roller 32 is positioned at the same height as the top surface of the panning platen 19, the document transport path from the transport roller 32 to the image reading position is a straight horizontal line, thereby increasing the accuracy of transporting the document at constant speed at the image reading position.

Consider a construction wherein only the transport roller is eliminated, i.e., eliminating the transport roller 32 from the present embodiment, to eliminate the disadvantage of conventional apparatuses wherein the diameter of the transport roller must be increased when the transport roller is disposed so as to abut the platen. Even in a construction which eliminates the transport roller 32, the lower limit of document transport precision can be maintained when a document is gripped by both the pair of rollers 31 on the upstream side of platen 19 and the pair of rollers 33 on the downstream side thereof. Sufficient document transport precision cannot be maintained when a document is gripped only by either the pair of rollers 31 on the upstream side or the pair of rollers 33 on the downstream side. Particularly in the form of the present embodiment, because the transport path to transport a document upward to the panning platen 19 must be provided above the mirror scanning platen 17, the document transport path assumes a curved shape leading downward to the image reading position, whereby a document is transported downward in a curved state in opposition to the stiffness of the document sheet. Therefore, the trailing edge of the document passes the pair of timing rollers 31 as the transport of said document advances such that said document trailing edge assumes a free state when released from said rollers thereby releasing the curved condition of the document via the stiffness of the sheet and causing disruption of the document during transport. In contrast, in the present embodiment, the transport state of the document is not disrupted at the moment the document trailing edge is released from the timing rollers 31 because a transport roller is provided adjacent to the image reading position.

As described above, the present invention transports a document between a transport member and guide member on the upstream side of the image reading position in an image reading apparatus provided with a document transporter to read a document image by transporting a document at uniform speed onto an image reading position of a stationary reader. Therefore, enlargement of the overall reading apparatus is avoided because a large transport member is not required at the image reading position. Furthermore, a document can be transported with excellent precision at the image reading position because the transport member is disposed adjacent to the image reading position.

Although the present invention has been described by way of example relating to a document transporting device of an analog copier in the previously described embodiment, it is to be understood that the invention is also applicable to the document transporting device of digital copiers, and digital scanners having an auto document feeder function and like devices.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus comprising:
   a reader to read document images, said reader having a stationary image reading position; and
   a transporter to transport a document at constant speed onto the image reading position, said transporter including a guide member and a transport member,
   said guide member to guide document transport and which is provided adjacent to the upstream side of the reading position in the direction of document transport, and
   said transport member provided above said guide member to transport a document between said guide member and said transport member without gripping said document between said guide member and said transport member.

2. An image reading apparatus as claimed in claim 1, wherein said guide member is a document scale.

3. An image reading apparatus as claimed in claim 1, wherein said transport member is a pair of rollers.

4. An image reading apparatus as claimed in claim 1, wherein said transport member does not make contact with said guide member, the guide member having at least one channel proximate the transport member.

5. An image reading apparatus as claimed in claim 1, wherein said transport member is constructed so as not to make contact with said guide member.

6. An image reading apparatus as claimed in claim 1, wherein said transport member is adjacent to the image reading position.

7. An image reading apparatus as claimed in claim 1 further having a glass paten, wherein the guide member is positioned on the upstream side of the glass paten in the direction of document transport.

8. An image reading apparatus as claimed in claim 1 wherein the transport member is a transport roller, the transport roller having a bottom surface at a position of equal height to a surface on said guide member.

9. An image forming apparatus comprising:
   a reader to read document images, said reader having a stationary image reading position;
   a transporter to transport a document at constant speed onto the image reading position, said transporter including a guide member and a transport member,
   said guide member to guide document transport and which is provided adjacent to the upstream side of the reading position in the direction of document transport, and
   said transport member provided above said guide member to transport a document between said guide member and said transport member without gripping said document between said guide member and said guide transport member; and
   an image forming device to form the image which is read by said reader.

10. An image forming apparatus as claimed in claim 9, wherein said guide member is a document scale.

11. An image forming apparatus as claimed in claim 9, wherein said transport member is a pair of rollers.

12. An image forming apparatus as claimed in claim 9, wherein said transport member does not make contact with said guide member, the guide member having at least one channel proximate the transport member.

13. An image forming apparatus as claimed in claim 9, wherein said transport member is constructed so as not to make contact with said guide member.

14. An image forming apparatus as claimed in claim 9, wherein said transport member is adjacent to the image reading position.

15. An image reading apparatus as claimed in claim 9 further having a glass platen, wherein the guide member is positioned on the upstream side of the glass platen in the direction of document transport.

16. An image reading apparatus as claimed in claim 9 wherein the transport member is a transport roller, the transport roller having a bottom surface at a position of equal height to a surface on said guide member.

17. An image reading apparatus comprising:
   a reader to read document images, said reader having a stationary image reading position; and
   a transporter to transport a document at constant speed onto the image reading position, said transporter including a guide member and a transport member,
   said guide member to guide document transport and which is provided adjacent to the upstream side of the reading position in the direction of document transport,
   said transport member to transport a document without gripping between said guide member and said transport member and provided above said guide member;

a mirror scanning glass platen for receiving the document to be read thereon in a mirror scanning mode; and a panning glass platen provided at the stationary image reading position, wherein the document to be read is transported across the panning glass platen in a panning mode.

18. An image reading apparatus as claimed in claim 17, wherein said guide member is a document scale.

19. An image reading apparatus as claimed in claim 17, wherein said transport member is a pair of rollers.

20. An image reading apparatus as claimed in claim 17, wherein said transport member does not make contact with said guide member.

21. An image reading apparatus as claimed in claim 17, wherein said transport member is constructed so as not to make contact with said guide member.

22. An image reading apparatus as claimed in claim 17, wherein said transport member is adjacent to the image reading position.

23. An image forming apparatus comprising:

a reader to read document images, said reader having a stationary image reading position;

a transporter to transport a document at constant speed onto the image reading position, said transporter including a guide member and a transport member, said guide member to guide document transport and which is provided adjacent to the upstream side of the reading position in the direction of document transport, said transport member to transport a document without gripping between said guide member and said transport member and provided above said guide member;

a mirror scanning glass platen for receiving the document to be read thereon in a mirror scanning mode;

a panning glass platen provided at the stationary image reading position, wherein the document to be read is transported across the panning glass platen in a panning mode; and an image forming device to form the image which is read by said reader.

24. An image forming apparatus as claimed in claim 23, wherein said guide member is a document scale.

25. An image forming apparatus as claimed in claim 23, wherein said transport member is a pair of rollers.

26. An image forming apparatus as claimed in claim 23, wherein said transport member does not make contact with said guide member.

27. An image forming apparatus as claimed in claim 23, wherein said transport member is constructed so as not to make contact with said guide member.

28. An image forming apparatus as claimed in claim 23, wherein said transport member is adjacent to the image reading position.

* * * * *